United States Patent
Schliebe et al.

(10) Patent No.: US 7,721,963 B2
(45) Date of Patent: May 25, 2010

(54) METHOD FOR GENERATING A PROTECTIVE ELECTROMAGNETIC FIELD FOR A CARD READING DEVICE

(75) Inventors: Dieter Schliebe, Bad Wünnenberg (DE); Michael Nolte, Brakel (DE); Thomas Nickel, Paderborn (DE)

(73) Assignee: Wincor Nixdorf International GmbH (DE)

( * ) Notice: Subject to any disclaimer, the term of this patent is extended or adjusted under 35 U.S.C. 154(b) by 80 days.

(21) Appl. No.: 11/991,306

(22) PCT Filed: Aug. 17, 2006

(86) PCT No.: PCT/EP2006/065395

§ 371 (c)(1),
(2), (4) Date: Feb. 29, 2008

(87) PCT Pub. No.: WO2007/048649

PCT Pub. Date: May 3, 2007

(65) Prior Publication Data

US 2009/0159676 A1    Jun. 25, 2009

(30) Foreign Application Priority Data

Sep. 12, 2005    (DE) .................. 10 2005 043 317

(51) Int. Cl.
*G06K 7/08* (2006.01)
(52) U.S. Cl. ...................................... 235/450; 235/449
(58) Field of Classification Search .................. 235/449, 235/450; 206/719–721
See application file for complete search history.

(56) References Cited

U.S. PATENT DOCUMENTS 6,390,367 B1    5/2002 Doig (Continued)

FOREIGN PATENT DOCUMENTS

DE    195 35 787 A1    3/1996

(Continued)

OTHER PUBLICATIONS

Svigals J: "Unauthorized Card Stripe Reading Inhibitor", IBM Technical Disclosure Bulletin, IBM Corp., New York, US, vol. 26, No. 6, Nov. 1, 1983, p. 2707, XP002145300; ISSN: 0018-8689.

(Continued)

*Primary Examiner*—Michael G Lee
*Assistant Examiner*—Suezu Ellis
(74) *Attorney, Agent, or Firm*—Harness, Dickey & Pierce, P.L.C.

(57) ABSTRACT

The invention describes a device for a self-service terminal which contains a card reading device, for preventing the possibility of data on a card which is to be read by the card reading device 10 being spied-out by means of a spying-out apparatus which is installed in the vicinity of the card reading device 10. The device comprises a protection apparatus 26 for generating a protective electromagnetic field which is suitable for impairing the functioning of the spying-out apparatus. The protection apparatus is controlled by a control unit 24 of the card reading device, which control unit also controls a card transportation apparatus 18 and/or a reading apparatus 20, 22 of the card reading device, such that the protective field is changed during reading of the card in the card reading device 10 such that it is ensured that reading of the card in the card reading device 10 is not impaired.

14 Claims, 1 Drawing Sheet

U.S. PATENT DOCUMENTS

| | | | |
|---|---|---|---|
| 6,422,475 B1 * | 7/2002 | May | 235/492 |
| 6,629,643 B1 * | 10/2003 | Nagata et al. | 235/475 |
| 7,100,829 B2 * | 9/2006 | Okada | 235/439 |
| 7,195,172 B1 * | 3/2007 | Scarafile et al. | 235/486 |
| 7,377,434 B2 * | 5/2008 | Wakabayashi | 235/449 |
| 2009/0050699 A1 * | 2/2009 | Basar et al. | 235/436 |

FOREIGN PATENT DOCUMENTS

| | | |
|---|---|---|
| DE | 690 22 976 T2 | 5/1996 |
| DE | 20 2004 008 380 U1 | 1/2005 |
| EP | 1 067 474 A2 | 1/2001 |
| EP | 1 394 728 A | 3/2004 |
| GB | 2 351 586 A | 1/2001 |
| JP | 2001067524 A * | 3/2001 |
| WO | WO 2006090739 A1 * | 8/2006 |
| WO | WO 2007048648 A1 * | 5/2007 |
| WO | WO 2007137919 A1 * | 12/2007 |

OTHER PUBLICATIONS

International Search Report (in English) and Written Opinion of the International Searching Authority (in German) for PCT/EP2006/065395, mailed Nov. 6, 2006; ISA/EP.

* cited by examiner

METHOD FOR GENERATING A PROTECTIVE ELECTROMAGNETIC FIELD FOR A CARD READING DEVICE

CROSS REFERENCE TO RELATED APPLICATIONS

This application is a U.S. National Stage Application of International application No. PCT/EP2006/065395, filed Aug. 17, 2006 and published in German as WO 2007/048649 A1 on May 3, 2007. This application claims the benefit of German Application No. 10 2005 043317.0, filed Sep. 12, 2005. The disclosure(s) of the above applications are incorporated herein by reference.

TECHNICAL FIELD

The present invention relates to a method for a self-service terminal, such as a cash machine, a statement printer and/or an information terminal, having a card reading device for a magnetic strip card, for preventing data on the magnetic strip card being read out by means of a spying-out device which is installed in the vicinity of the card reading device.

PRIOR ART

The self-service terminal here may be formed, for example, by a statement printer or a cash machine. In this case, the card to be read may be a bank card with a magnetic strip on which customer and account data is stored. The spying-out apparatus may be formed by a small, possibly inconspicuous, foreign card reader which is installed directly in front of the insertion slot for the genuine card reader of the self-service terminal by third parties with fraudulent intent. When a customer inserts his bank card into the card reader of the self-service terminal, the magnetic track of said bank card is read by this foreign card reader too, as a result of which third parties acquire the customer and account information.

By spying-out this information, the third party is able to manufacture a copy of the bank card. If the third party is also able to spy-out the personal identification number (the so-called PIN) associated with the bank card, the third party is able to use the forged bank card and the spied-out PIN at cash machines to withdraw cash from the associated account.

The described fraudulent procedure of gaining access to foreign customer accounts by spying-out customer information is called "skimming" or card abuse in technical circles. The spying-out apparatuses used for skimming have been increasingly refined in recent years, both in terms of their increasingly smaller size and also in terms of their visual camouflaging, so that it is very difficult to identify the spying-out apparatuses.

One way of preventing data on a card which is to be read by the data reading device being spied-out involves generating a protective electromagnetic field which is suitable for impairing the functioning of a magnetic card reading head of the spying-out apparatus. This protective field has to be positioned exactly where spying-out apparatuses can be installed, that is to say directly in front of the insertion slot of the "genuine" card reading device. In addition, the protective field has to be strong enough to ensure that the functioning of the spying-out apparatus is effectively impaired, so that the data cannot be read from the card.

However, it is not easy to position a protective field of this type such that it does not inadvertently impair the reading function of the card reading device of the self-service terminal. For example, in many card reading devices, a so-called magnetic track preidentification head is located immediately behind the insertion slot, which magnetic track preidentification head is used to determine whether the card has been inserted the right way up, that is to say whether the magnetic strip is in the correct position. A magnetic track preidentification head of this type is located relatively close to the region in which the protective field has to be generated, and the magnetic track preidentification head can therefore be easily adversely affected by the protective field during reading. This adverse effect may lead, for example, to a magnetic card which has been inserted the right way up being blocked, or to a magnetic card which has been inserted the wrong way up being accepted. However, reading heads which are arranged further inside the card reading device may also be inadvertently adversely affected or disturbed by the protective field.

SUMMARY OF THE INVENTION

In practice, it has proven difficult to find a good balance between sufficient strength and positioning of the protective field on one hand and reliable undisturbed operation of the card reading device on the other.

Technical Object

The invention is based on the object of specifying a method of the type mentioned in the introduction, having a protection apparatus for generating a protective electromagnetic field, in which method disturbance of the card reading device by the protective electromagnetic field is prevented in a reliable and simple manner.

Technical Solution

This object is achieved in that the protection apparatus is controlled by a control unit of the card reading device, which is, amongst other things, at least provided for controlling a card transportation apparatus and/or a reading apparatus of the card reading device, in such a way that the protective field is changed at least for the time period over which the card is read in the card reading device such that reading of the card in the card reading device is not impaired. In this case, the change in the protective field may involve, in particular, said protective field being switched off. The object is further achieved by a method as claimed in Claim 14.

Therefore, instead of adjusting the strength and position of the protective field such that the card reading device is not adversely affected, according to the present invention the protective field is changed, that is to say in particular weakened or switched off, at that time at which the card reading device may be adversely affected, that is to say during reading by the reading apparatus of the card reading device. As a result, an adverse effect on the card reading device by the protective field is completely precluded.

A further important aspect of the solution according to the invention involves the protection apparatus being actuated by the control unit of the card reading device which is provided for controlling the card transportation apparatus and/or the reading apparatus of the card reading device. This represents a very simple and reliable way of synchronizing changing or switching off of the protective field with reading of the card in the card reading device, as will be explained in greater detail below with reference to an exemplary embodiment.

It is important for the functionality of the invention that the protective field is changed or switched off at least at the beginning of reading of a card, remains in the changed or switched off state during reading and is reestablished only after reading has ended. It goes without saying that the protective field can also be changed or switched off as early as somewhat before the beginning of reading by the card reading device, but preferably at the earliest when part of the magnetic track of the card to be read is already located in the card reading device. This ensures that, after the protective effect of the protective field disappears, a spying-out apparatus can at best read out part of the magnetic track with which generally no information can be captured.

The protective field likewise does not necessarily have to be reestablished immediately after reading by the card reading device has ended, but preferably before the magnetic track of the card has completely left the card reading device.

The protection apparatus preferably comprises an inductor for generating the protective field. In a particularly advantageous development, a mouthpiece or a cover of the card reading device is composed of plastic and the inductor is integrated in this mouthpiece or the cover.

The protective field is preferably an alternating electromagnetic field with a frequency of from 20 to 50 kHz, preferably of from 40 to 50 kHz.

In an advantageous development, the device further comprises a sensor system which is suitable for determining the presence of a spying-out apparatus. In this case, the sensor system advantageously comprises an apparatus for metal detection, preferably having at least one first inductor for generating a primary electromagnetic field and at least one second inductor which is suitable for detecting a secondary electromagnetic field which is influenced by the interaction of the primary electromagnetic field with metal components of the spying-out apparatus.

By means of this sensor system, the device can not only suppress the functioning of spying-out apparatuses but also trace the spying-out apparatuses and, if necessary, shut down the self-service terminal. This provides double protection against fraudulent spying-out.

BRIEF DESCRIPTION OF THE DRAWINGS

Further advantages and features of the present invention can be found in the following description in which the invention is described on the basis of an exemplary embodiment with reference to the FIGURE, in which:

FIG. 1 shows a simplified schematic structure of a card reading device 10 which can be used for a self-service terminal, for a statement printer or a cash machine in the exemplary embodiment shown. The card reading device has a housing 12 with a, preferably plastic, cover 14 on the front face. An insertion slot 16 is formed in the cover 14, and a bank card (not shown) can be inserted into the card reading device 10 through said insertion slot.

Figure 1:
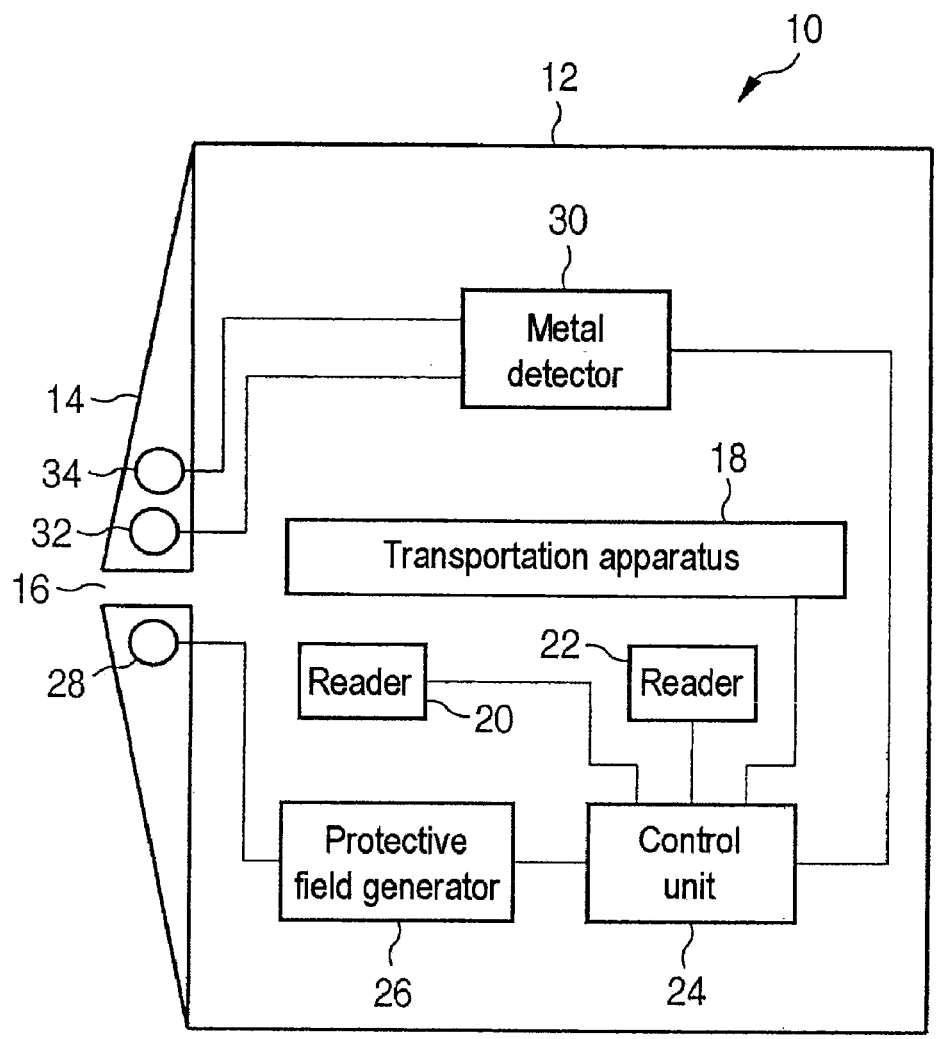
FIG. 1 shows a card reading device for a self-service terminal having a device for preventing data from a card which is to be inserted being read out by means of a spying-out apparatus which is installed in the vicinity of the card reading device.

A transportation apparatus 18 adjoins the insertion slot 16 directly at the rear.

The transportation apparatus 18 generally comprises rollers for transporting the bank card, the drive motors of said rollers and a plurality of sensors for determining the position of the bank card in the transportation apparatus 18. However, these details are not shown in the simplified illustration of FIG. 1. Furthermore, a flap (not shown) is counted as part of the transportation apparatus 18 in this description, said flap being closed by a flap drive (not shown) after insertion of the bank card.

A reading apparatus for reading the magnetic strip of the bank card is arranged within the transportation apparatus 18 along the transportation path of the card, a first magnetic reading head 20 and a second magnetic reading head 22 of said reading apparatus being shown in FIG. 1. The transportation apparatus 18 and the reading heads 20 and 22 are connected to a control unit 24 via signal lines, and the control unit, in turn, is connected to a PC of the self-service terminal via an interface.

A device for preventing data from a bank card being read out by means of a spying-out apparatus (not shown) which is arranged directly in front of the insertion slot 16 by third parties is also integrated in the card reading device 10 of FIG. 1. The device comprises a protective field generator 26 which has a signal input for signals from the control unit 24 and to which a protective field inductor 28 is connected. The device advantageously also comprises a metal detector 30 which likewise has a signal input for signals from the control unit 24 and to which a first inductor 32 and a second inductor 34 are connected. The protective field inductor 28, the first inductor 32 and the second inductor 34 are encapsulated in the plastic cover 14 of the card reading device 10 and are therefore integrated in said plastic cover and are preferably in the form of coils.

BEST WAY OF IMPLEMENTING THE INVENTION

As long as a card is not inserted into the card reading device 10, the protective field generator 26 generates a protective electromagnetic field which is positioned in the region in front of the insertion slot 16, by means of the protective field inductor 28. The protective field is adjusted such that it impairs the functioning of a foreign magnetic track reader, which has been installed in front of the insertion slot 16 with fraudulent intent, such that no valuable data can be read out from the magnetic strip by this foreign magnetic track reader. In addition, the metal detector 30 generates a primary electromagnetic field in the region of the insertion slot 16 by means of the first inductor 32. This primary electromagnetic field would interact with metal components, which are necessarily contained in a foreign reading apparatus, and generate eddy currents in said components. Interaction of the primary electromagnetic field with the metal components of the foreign reading apparatus generates a secondary electromagnetic field which is detected by the metal detector 30 by means of the second inductor 34. In this way, the metal detector 30 can be used to determine whether a foreign reading apparatus has been installed, for example when a foreign metal object has been detected by the metal detector 30 for a predetermined period of time.

The magnetic card of a customer is doubly protected against spying-out attacks on account of the metal detection and the generation of the protective field.

When a bank card is inserted into the insertion slot 16, this is detected by means of a sensor, and the bank card is transported into the card reading device 12 and moved past the reading head 22 of the reading apparatus of the card reading device 12 by the transportation apparatus 18, so that the magnetic strip of the bank card can be read out. However, before the bank card is even moved into the card reading device 12 by the transportation apparatus 18, the reading head 20, which is also called a magnetic track preidentification head, determines whether the magnetic strip is in the correct position, that is to say whether the magnetic card has been inserted into the insertion slot 16 with the correct orientation.

Since reading of the magnetic strip and movement of the bank card by the transportation apparatus 18 are closely linked to one another and are synchronized with one another, the transportation apparatus 18 and the reading heads 20 and 22 are controlled by the same control unit 24. The present invention has made use of the fact that the beginning and the end of reading of the magnetic strip by the reading heads 20 and 22 are explicitly determined and taken into account during transportation and reading control by the control unit 24, in order to synchronize time control of the protective field with the reading process of the card reading device 10. To this end, the protective field generator 26 is actuated by the same control unit 24 which also controls the transportation apparatus 18 and the reading heads 20 and 22 of the reading apparatus, specifically in such a way that the protective field is switched off during reading of the bank card in the card reading device 10 and is reestablished after reading has ended. Instead of completely switching off the protective field, its intensity could also be reduced or changed in some other way, as long as it is ensured that the changed protective field does not impair reading of the card in the card reading device 10.

In addition, it is not absolutely necessary to switch off the protective field immediately when reading begins and reestablish said protective field immediately when reading is ended. However, the protective field should always be built up at least when the bank card is fully or almost fully located outside the card reading device 10.

As a result of the protective field being switched off or reduced during reading of the bank card in the card reading device 10, impairment of reading in the card reading device 10 by the protective field can be precluded in a simple and reliable manner.

The invention claimed is:

1. A card reading device for preventing data from being read from a magnetic strip card by a spying-out device installed proximate to the card reading device by a third party with fraudulent intent comprising:
    a protective field generator and an inductor for generating a protective electromagnetic field that is operable to impair the spying-out device;
    a reading head for reading the magnetic strip card; and
    a control unit for controlling at least one of the protective field generator, a card transportation apparatus, and the reading head, the control unit modifies the protective electromagnetic field when the card is read by the card reading device to prevent the card reading device from being impaired by the protective electromagnetic field.

2. The device of claim 1, wherein the protective electromagnetic field is switched off when the card is being read by the card reading device.

3. The device of claim 1, wherein the control unit controls the protective field generator such that the protective electromagnetic field is modified only when part of a magnetic track of the card is within the card reading device.

4. The device of claim 1, wherein the control unit reestablishes the protective electromagnetic field after the card is read by the card reading device.

5. The device of claim 1, wherein the protective field generator is within a housing of the card reading device.

6. The device of claim 5, wherein the inductor is integrated in one of a mouthpiece and a cover mounted at an exterior of the housing.

7. The device of claim 6, wherein at least one of the mouthpiece and the cover includes plastic.

8. The device of claim 7, wherein the inductor is encapsulated in one of the mouthpiece and the cover.

9. The device of claim 1, wherein the protective electromagnetic field is an alternating electromagnetic field with a frequency of from 20 to 50 kHz.

10. The device of claim 1, further comprising a sensor system that is operable to identify the presence of the spying-out device.

11. The device of claim 10, wherein the sensor system comprises a metal detector operable to identify metallic components of the spying-out device.

12. The device of claim 11, wherein the metal detector is connected to a first inductor for generating a primary electromagnetic field and a second inductor for detecting a secondary electromagnetic field that is modified by interaction of the primary electromagnetic field with metallic components of the spying-out device.

13. The device of claim 1, wherein the control unit instructs the protective field generator to reestablish the protective electromagnetic field before a magnetic track of the card has completely exited the card reading device.

14. The device of claim 1, wherein the protective electromagnetic field is an alternating electromagnetic field with a frequency of from 40 to 50 kHz.

* * * * *